(12) United States Patent
Kujawa

(10) Patent No.: US 6,766,909 B2
(45) Date of Patent: Jul. 27, 2004

(54) SEPARATION DEVICE FOR A FLOTATION MACHINE

(75) Inventor: Christian Kujawa, Highlands Ranch, CO (US)

(73) Assignee: Outokumpu Oyj, Espoo (FI)

(*) Notice: Subject to any disclaimer, the term of this patent is extended or adjusted under 35 U.S.C. 154(b) by 0 days.

(21) Appl. No.: 10/293,406

(22) Filed: Nov. 13, 2002

(65) Prior Publication Data

US 2004/0089596 A1 May 13, 2004

(51) Int. Cl.[7] .................................................. B03D 1/14
(52) U.S. Cl. ...................................... 209/168; 209/170
(58) Field of Search ................................ 209/168, 169, 209/170

(56) References Cited

U.S. PATENT DOCUMENTS 4,990,246 A * 2/1991 Blazejczak et al.
5,039,400 A   8/1991 Kallioinen et al.

FOREIGN PATENT DOCUMENTS

SU      441907   * 5/1974
WO    02/49768     6/2002

* cited by examiner

Primary Examiner—Thomas M. Lithgow
(74) Attorney, Agent, or Firm—Morgan & Finnegan, L.L.P.

(57) ABSTRACT

Invention relates to a flotation machine which at least contains a flotation cell (2) having a means for feeding slurry in the floatation cell, a means for feeding gas into the slurry and producing aerated slurry (4) and froth (3), a means for removing froth from the flotation cell and a means for removing tailings from the flotation cell, when the flotation cell (2) is provided with at least one separation device (5), which is arranged to float at the interface (6) between phases having different densities, such as froth (3) and aerated slurry (4), in order to improve the removal of froth phase from the flotation cell.

8 Claims, 2 Drawing Sheets

SEPARATION DEVICE FOR A FLOTATION MACHINE

Figure 1A:
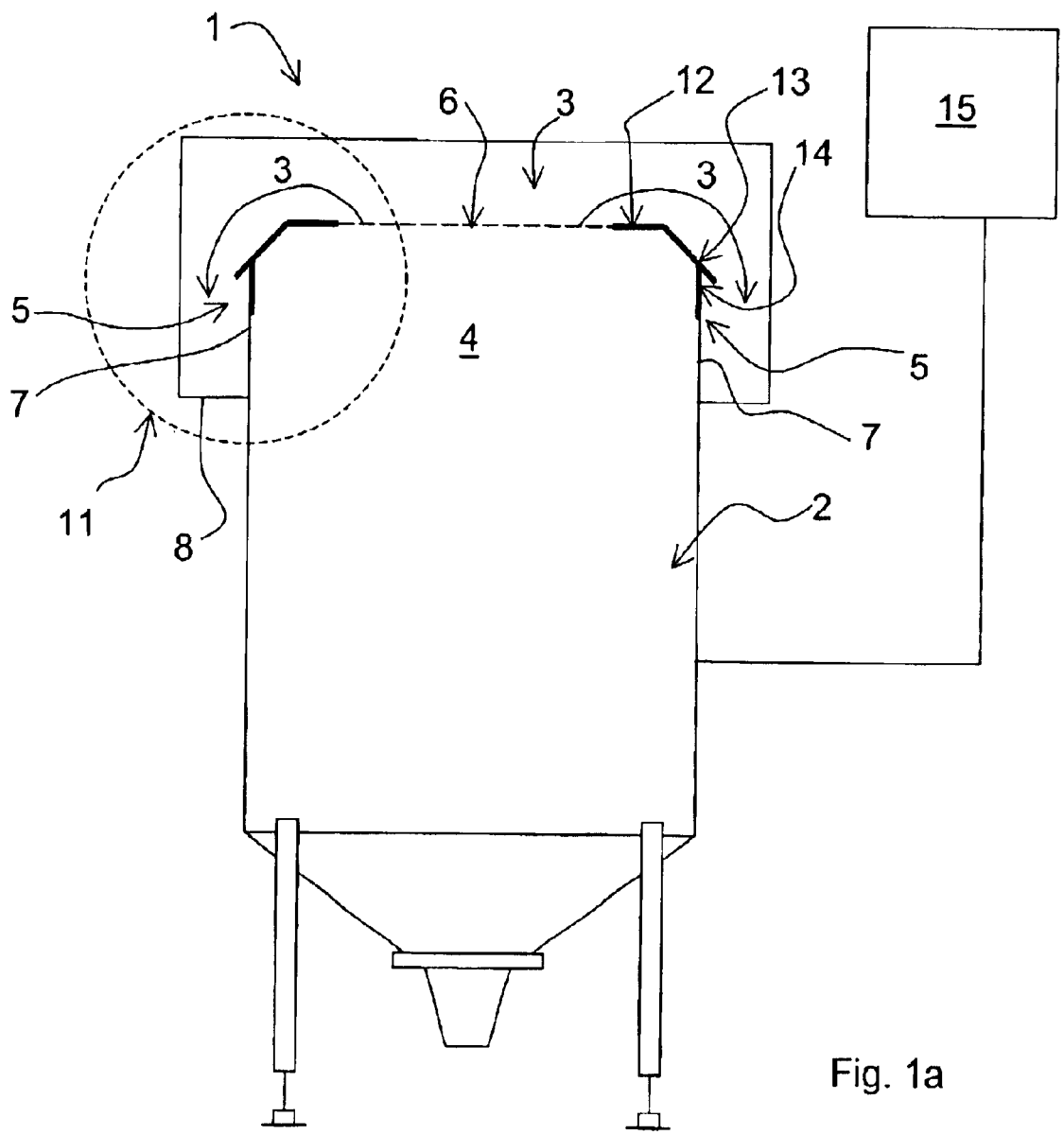

The invention relates to a flotation machine which at least contains a flotation cell having a means for feeding slurry in the flotation cell, a means for feeding gas into the slurry and producing aerated slurry and froth, a means for removing froth from the flotation cell and a means for removing tailings from the flotation cell, when the flotation cell is provided with at least one separation device, which is arranged to float at the interface between phases having different densities, such as froth and aerated slurry, in order to improve the removal of froth phase from the flotation cell.

A froth flotation machine for recovering valuable mineral particles normally comprises a flotation cell in the form of a tank having an inlet in the cell wall for feeding slurry for flotation as well as an outlet for discharging of the tailings from the lower part of the cell. Flotation cells may be single mixing vessels, in series or in parallel. They may be either rectangular or cylindrical in shape, in horizontal or upright position. Gas is routed through the hollow mixing shaft or via some other means to the gas dispersion mechanism in the cell. The gas dispersion mechanism causes a powerful suction as it rotates, which sucks the gas into the gas dispersion mechanism space. In the gas dispersion mechanism space the slurry is contacted with the flotation gas, which is simultaneously been finely dispersed into gas bubbles. Usually baffles are installed around the gas dispersion mechanism, which promotes gas dispersion and attenuates the rotation of the slurry. The hydrophobic mineral particles stuck to the gas bubbles rise from the gas dispersion mechanism to the surface into the froth layer, overflowing from there out of the cell into the froth launder.

Nowadays it is becoming increasingly common to use upright cells, which are also cylindrical and normally flat-bottomed. One problem with flotation cells is sanding, i.e. solid matter builds up on the bottom of the cell in an immovable layer. This is usually due to a too small or ineffective rotor, as in such a case the mixing zone of the rotor does not extend far enough. Another common difficulty is that the mineral particles already attached to the gas bubbles cannot be removed from the flotation cell, because the flows forming in the cell and particularly at its surface and upper section are wrongly oriented or too weak i.e. they are not able to move the floated gas bubbles out of the cell.

A Finnish patent application 20002801 describes a flotation machine to be used in flotation of slurry for separation valuable components from tailings, in which machine a device is installed in the upper part of the cell froth zone so that at least one part of the rotating device is partly immersed into the froth in order to improve the removal of froth from the flotation machine.

The U.S. Pat. No. 5,039,400 describes a regulating member for froth created in a flotation machine. This regulating member is a cone which top is immersed in the froth. Thus the free area of froth is upwards decreased and the froth is obliged to go closer to the wall of the flotation cell and thus closer to the concentrate launder surrounding the upper part of the flotation cell.

Usually the froth is removed from flotation cell by overflow. A froth depth needs to be maintained in the flotation machine to ensure that no slurry also overflows. Slurry will dilute the froth again. A definitive froth layers improve the mineral grade content in the overflow. At times however shallow froth depths are desirable to achieve high froth recoveries and therefore recoveries of the wanted minerals. Maintaining shallow froth depths and keeping the slurry from overflowing is very difficult to do successfully because of the dynamic factors involved.

The object of the present invention is to eliminate drawbacks of the prior art and to achieve a separation device for improving the removal of froth from the flotation cell without slurry.

The essential features of the invention are enlisted in the appended claims.

According to the invention a flotation machine which at least contains a flotation cell having a means for feeding slurry in the flotation cell, a means for feeding gas into the slurry and producing aerated slurry and froth, a means for removing froth from the flotation cell and a means for removing tailings from the flotation cell, is provided with at least one separation device, which is arranged to float at the interface between phases having different densities, such as froth and aerated slurry, in order to improve the removal of froth phase from the flotation cell.

According to this invention the separation device is attached on the immediate vicinity of the fixed overflow edge. The separation device is placed in the connection with the fixed overflow edge so that the froth cannot flow below the separation device. Also, at least part of the separation device, such upper part is in the same plane with the interface between two phases and the middle part of the separation device is downward oriented and the lower part is in the same plane with the fixed overflow edge. This upper part being at the interface between two phases, such as aerated slurry and froth, it prevents the spilling of slurry across the separation device. The middle part being downward oriented promotes the discharge of froth into a launder.

The froth is arranged to flow essentially over the separation device during flotation. The separation device is advantageously made of material, which is lighter than the aerated slurry. Because the froth phase is lighter than aerated slurry phase, the separation device can float at the interface of those phases and advantageously separate the froth from slurry continuously during flotation process. When using the separation device of the invention for froth removal, it enables a far more complete removal of the froth phase, reducing the fall-back or collapse of froth as it is often seen in mineral flotation, at the same time reducing the slurry overflow with the froth.

According to one example of the invention the separation device is being hinged at least from one place. Then the separation device can be adjusted in different heights depending on the height of the interface between froth and aerated slurry. According to one example of the invention the separation device is arranged to cover at least part of the perimeter of the flotation cell. Also it is possible that the separation device is arranged to cover the whole perimeter of the flotation cell.

According to the one example of invention the separation device is equipped with at least one adjusting device in order to change the height of the separation device. Also according to the one example of invention the separation device is equipped with a flexible sealing element in order to seal the space between the separation device and the fixed overflow edge. According to one example of the invention the separation device is equipped with a control system. Then it is possible to monitor the froth characteristics or other process parameters in order to follow the functioning of the separation device. According to one example of the invention the flotation cell is provided with two separation devices, the one of which is arranged to float at the interface between the froth and the aerated slurry and the other is arranged to float essentially inside the froth. Two separation devices promote the froth removal even further.

The separation device will ensure a maximum removal of the froth from the flotation cell without slurry. The separation device remains at the interface, by its buoyancy adjusting to changes in height by the interface. The separation device of the invention could be installed in one or in as many of flotation cells in a flotation circuit as needed. Overall the flotation plant efficiency and workability will be highly improved by using the separation device of the invention.

The invention is described further by means of the attached drawings:

FIG. 1a A separation device in the connection with the flotation cell

Figure 1B:
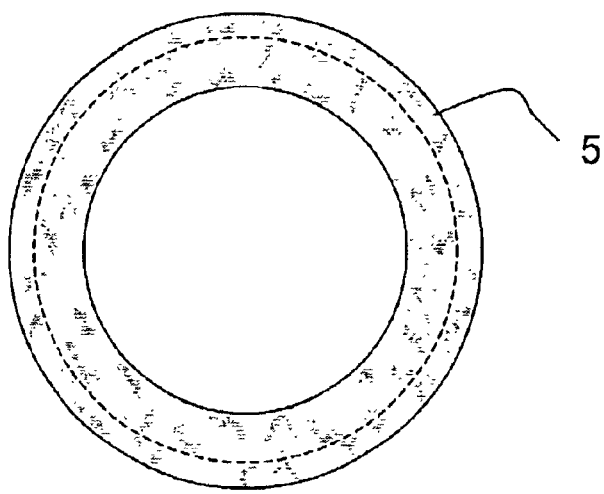

FIG. 1b The separation device as seen in plan view

Figure 2A:
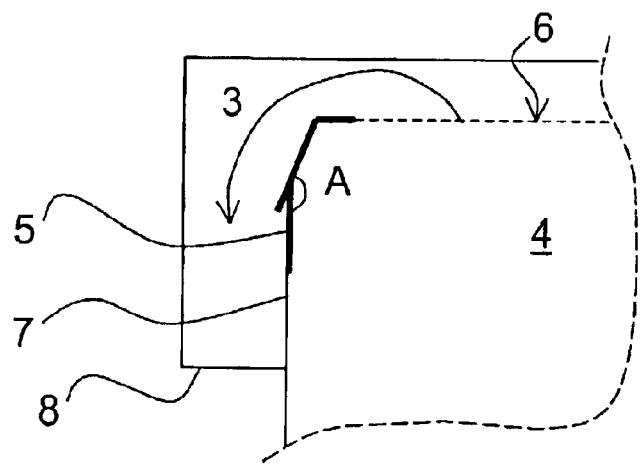

FIG. 2a Another embodiment of the design of separation device

Figure 2B:
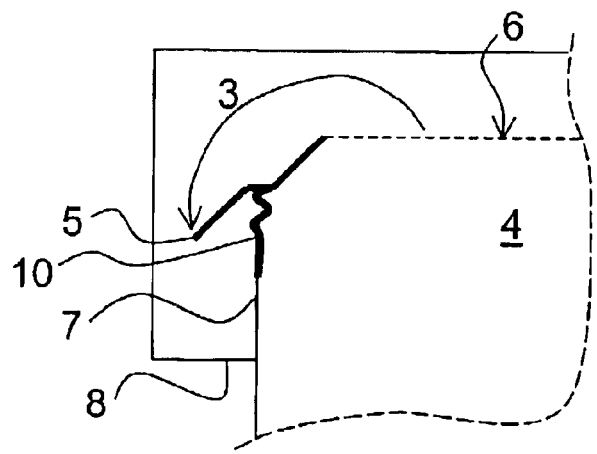

FIG. 2b Another embodiment of the design of separation device

Figure 2C:
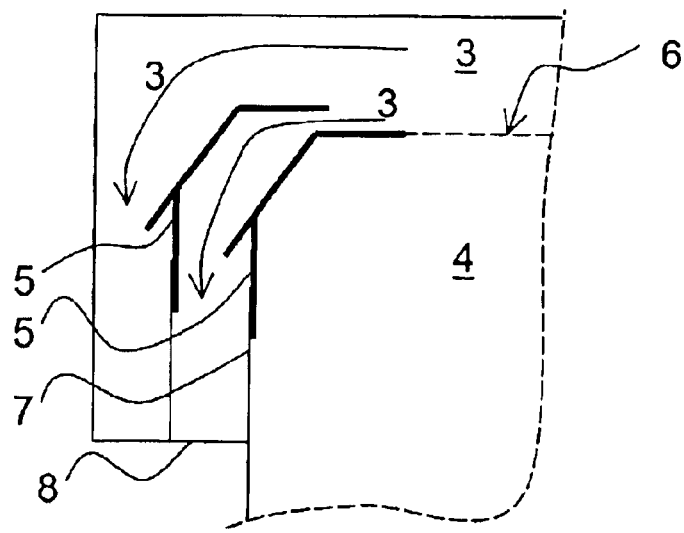

FIG. 2c Another embodiment of the design of separation device

FIG. 1a shows a section view of typical flotation machine 1, in which the flotation cell 2 is provided with one separation device 5, which is arranged to float at the interface 6 between phases having different densities, such as froth 3 and aerated slurry 4, in order to improve the removal of froth phase 3 from the flotation cell into a collecting launder 8. FIG. 1b describes the separation device 5 from above. The separation device 5 is being attached into the fixed overflow edge 7 by using some kind of guiding brackets, for example bolts. The separation device according to this example covers the whole perimeter of the cell 2 and is made of lighter material than the aerated slurry 4, such as for example plastic or other hollow material. The froth 3 is again lighter than the separation device and is removed from the cell by overflow. The separation device 5 floats at the interface 6 between the aerated slurry 4 and the froth 3, and it divides those phases 3 and 4 apart from each other. The shape of the separation device is designed in this example so that the upper part 12 of the separation device is in the same plane with the interface 6 and the middle part 13 of the device 5 is downward oriented and the lower part 14 is in the same plane with the fixed overflow edge 7. The separation device 5 is equipped with a control system 15, in order to control the froth characteristics or other process parameters. The marked area 11 is shown in other pictures 2a, 2b and 2c, which are other applications of the invention.

FIG. 2a shows an example of invention, when the separation device 5 is being hinged from the position A near the fixed overflow edge. This type of separation device advantageously contributes the froth 3 separation from aerated slurry 4 at the interface 6 between those phases and adjusts to different interface levels by virtue of its buoyancy, but moving around the hinge. The separation device 5 is attached to the fixed overflow edge 7 and froth flows into the collection launder 8 by overflow.

FIG. 2b shows another application of invention, in which the separation device 5 is equipped with adjusting device 10 in order to change the height of the separation device when the interface 6 between aerated slurry 4 and froth 3 moves upwards or downwards. Adjusting device 10 is attached into the fixed overflow edge 7 and is made of flexible material in order to separation device to operate at different levels. The separation device 5 is attached in the vicinity of the fixed overflow edge 7 and froth 3 flows into the collection launder 8 by overflow.

FIG. 2c shows another example of the invention when the flotation cell is provided with two separation devices 5, the one of which is arranged to float at the interface 6 between froth 3 and aerated slurry 4 and the other is arranged to float essentially inside the froth 3 at a certain height above the other separation device to recover an upper section of the froth 3. In this way different froth qualities having different densities and mineral grades can be accumulated simultaneously by flow over the separation devices. The other separation device is attached into the fixed overflow edge 7 and the other is attached into the collection launder 8.

What is claimed is:

1. Flotation machine which comprises a flotation cell having a means for feeding slurry in the flotation cell, a means for feeding gas into the slurry and producing aerated slurry and froth, a means for removing froth from the flotation cell and a means for removing tailings from the flotation cell, the aerated slurry and froth being comprised of phases having different densities with an interface therebetween, the aerated slurry phase having a density higher than the density of the froth phase, the flotation cell being provided with at least one separation device, the separation device being attached in the immediate vicinity of a fixed overflow edge so that the froth flows essentially over but cannot flow below the separation device, the separation device having a material density that is lower than the density of the aerated slurry phase and higher than the density of the froth phase, the separation device being arranged to float at the interface between the aerated slurry and froth phases and able to move upwards and downwards in the slurry along with changing levels of the aerated slurry, the separation device has an upper part, a middle part, and a lower part, and at least part of the upper part is in the same plane with the interface between the two phases and the middle part of the separation device is connected to the upper part and is downwardly angled with respect to the upper part, and a lower part connected to the middle part and is in the same plane with the fixed overflow edge.

2. Flotation machine according to claim 1, wherein the separation device is hinged at least from one place.

3. Flotation machine according to claim 1, wherein the separation device is arranged to cover at least part of the perimeter of the flotation cell.

4. Flotation machine according to claim 1, wherein the separation device is arranged to cover the whole perimeter of the flotation cell.

5. Flotation machine according to claim 1, wherein the separation device is equipped with at least one adjusting device in order to change the height of the separation device.

6. Flotation machine according to claim 1, wherein the separation device is equipped with a flexible sealing element in order to seal the space between the separation device and the fixed overflow edge.

7. Flotation machine according to claim 1, wherein the separation device is equipped with a control system.

8. Flotation machine according to claim 1, wherein the flotation cell is provided with two separation devices, one of which is arranged to float at the interface between the froth and the aerated slurry and the other is arranged to float essentially inside the froth.

* * * * *